United States Patent [19]

Petruccelli et al.

[11] Patent Number: 5,185,914
[45] Date of Patent: Feb. 16, 1993

[54] GOLF CLUB AND METHOD OF MAKING SAME

[76] Inventors: Dom Petruccelli, 6 Norcrest Dr., Toronto, Ontario, Canada, M6L 2T1; Marc Petruccelli, 271 Ridley Blvd., #702, Toronto, Ontario, Canada, M5M 4N1

[21] Appl. No.: 818,105

[22] Filed: Jan. 8, 1992

[51] Int. Cl.$^5$ .................. B23P 19/04; B21D 39/00; B29C 67/00; A63B 53/04
[52] U.S. Cl. .................. 29/460; 29/508; 29/527.3; 29/527.4; 264/46.7; 264/328.16; 273/78; 273/80.3; 273/173
[58] Field of Search .......... 29/460, 508, 517, 525, 29/527.1, 527.2, 527.3, 527.4; 264/46.4, 46.7, 259, 279, 328.1, 328.14, 328.16, 328.18; 273/80.2–80.7, 167 R, 78, 173

[56] References Cited

U.S. PATENT DOCUMENTS

| | | | |
|---|---|---|---|
| 3,140,094 | 7/1964 | Hings | 273/80.3 |
| 3,266,805 | 8/1966 | Bulla | 273/80.2 X |
| 3,571,900 | 3/1971 | Hardesty | 273/173 X |
| 4,076,254 | 2/1978 | Nygren . | |
| 4,438,931 | 3/1984 | Motomiya | 273/80.2 X |
| 4,451,042 | 5/1984 | Hayashi et al. . | |
| 4,545,580 | 10/1985 | Tomita et al. . | |
| 4,988,104 | 1/1991 | Shiotani et al. | 273/80.2 X |
| 5,000,454 | 3/1991 | Soda . | |
| 5,009,425 | 4/1991 | Olumoto et al. . | |

FOREIGN PATENT DOCUMENTS

| | | |
|---|---|---|
| 582929 | 9/1959 | Canada . |
| 729083 | 3/1966 | Canada . |
| 956661 | 10/1974 | Canada . |
| 1050580 | 3/1979 | Canada . |
| 1174250 | 9/1984 | Canada . |
| 1208675 | 7/1986 | Canada . |
| 0174169 | 10/1984 | Japan .................. 273/173 |
| 2240481 | 8/1991 | United Kingdom ........ 273/173 |

Primary Examiner—Timothy V. Eley
Attorney, Agent, or Firm—Shoemaker and Mattare, Ltd.

[57] ABSTRACT

A golf club includes a straight shaft and a metallic member having a first end connected to the lower end of the shaft. The other end of the metallic member is bent to define an obtuse angle with the first end. In a preferred form, a flat metallic stiffener plate is welded or otherwise affixed to one side of the metallic member. These portions are placed in a suitable mold into which polyurethane is admitted, and heat is differentially applied to or removed from the various surfaces of the mold in order that the polyurethane solidifies to form a substantially flat striking layer of dense integral-skin polyurethane juxtaposed against the stiffener plate remote from the metallic member, and a back cushion enclosing the stiffener plate and all of the metallic member. The back cushion is thicker than the striking layer, and is of polyurethane less dense than that of the striking layer. Preferably, the stiffener plate has marginal portions extending beyond the metallic member, and these marginal portions have apertures through which the polyurethane of the striking layer can integrally bond with the polyurethane of the back cushion.

8 Claims, 2 Drawing Sheets

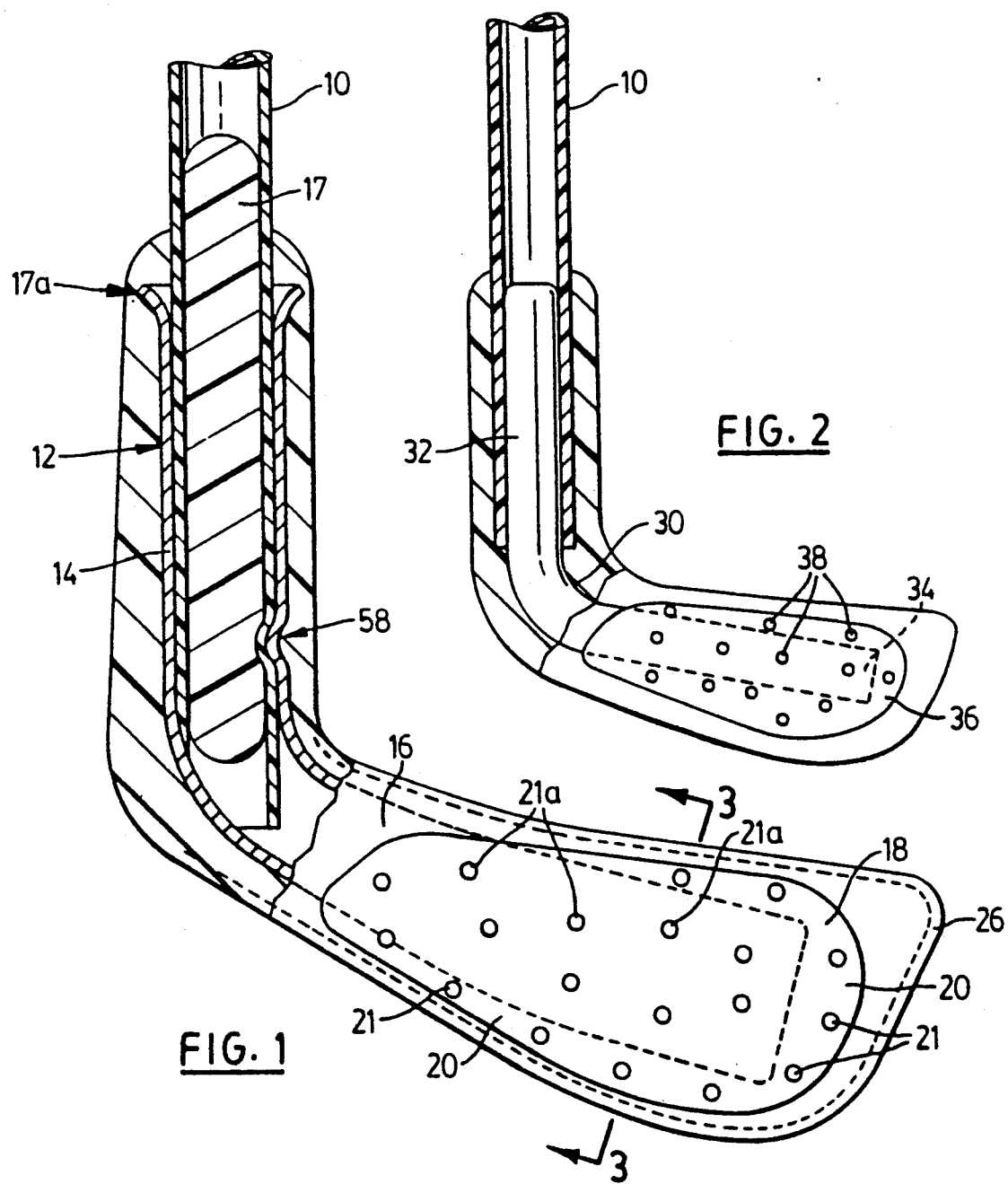

GOLF CLUB AND METHOD OF MAKING SAME

This invention relates generally to golf clubs and method by which golf clubs can be made.

BACKGROUND OF THIS INVENTION

Traditionally, golf clubs have been made with a metal shaft and a wooden or iron head. More recently, however, other materials have been utilized, specifically reinforced plastics for the shaft, and various combinations of plastic and metal for the head. The goal of such prior constructions has always been to provide a golf club that is substantially indistinguishable from the traditional wood or iron clubs.

There is currently a need for a golf club with the same shape, length and lie as traditional clubs, but which weighs significantly less. Such lighter clubs are needed for schools, Parks and Recreation Departments, the YMCA, Boys and Girls Clubs, institutions, and golf courses for children. Such lighter clubs would also be ideal for any application where the club is supplied and the suppliers could be sued for injury or damage. There is also a need for a club with a cushioned outer surface on the head, to lessen the risk of injury should the club head strike another person.

PRIOR ART

The following patents all relate in some manner to the structure or manufacture of golf clubs which are distinguishable from the traditional club.

Canadian Patent No. 47,555, issued Nov. 30, 1894;
Canadian Patent No. 290,440, issued Jun. 11, 1929;
Canadian Patent No. 309,266, issued Mar. 10, 1931;
Canadian Patent No. 582,929, issued Sep. 8, 1959;
Canadian Patent No. 729,083, issued Mar. 1, 1966;
Canadian Patent No. 956,661, issued Oct. 22, 1974;
Canadian Patent No. 1,050,580, issued Mar. 13, 1979;
Canadian Patent No. 1,174,250, issued Sep. 11, 1984;
Canadian Patent No. 1,208,675, issued Jul. 29, 1986;
U.S. Pat. No. 4,076,254, issued Feb. 28, 1978;
U.S. Pat. No. 4,451,042, issued May 29, 1984;
U.S. Pat. No. 4,545,580, issued Oct. 8, 1985;
U.S. Pat. No. 4,553,755, issued Nov. 19, 1985;
U.S. Pat. No. 5,000,454, issued Mar. 19, 1991;
U.S. Pat. No. 5,009,425, issued Apr. 23, 1991.

Although the patents listed above show constructions which are distinguishable from the conventional one, there remains a need for a club structure that allows the weight reduction and safety enhancement mentioned above.

GENERAL DESCRIPTION OF THIS INVENTION

Accordingly, this invention provides a golf club which includes a substantially straight shaft having upper and lower ends, and a head affixed to the lower end of the shaft, the head comprising:

a metallic member having a first portion which is straight and tubular, and a second portion which is substantially flattened and bent to define an obtuse angle with said first portion, said tubular first portion snugly receiving said lower end of said shaft, a flat metallic stiffener plate securely affixed to one side of said second portion of the metallic member, a substantially flat striking layer of dense, integral-skin polyurethane juxtaposed against the stiffener plate remote from said second portion of the metallic member, and a back cushion enclosing said stiffener plate and all of said metallic member, the back cushion being of polyurethane less dense than that of the striking layer, and integrally contacting said striking layer.

Further, this invention provides a golf club which includes a substantially straight shaft having upper and lower ends, and a head affixed to the lower end of the shaft, the head comprising:

a stiff core member having a first portion which is affixed to the lower end of said shaft, and a second portion which is bent to define an obtuse angle with said first portion, means on said second portion defining a substantially flat surface, a substantially flat striking layer of hard, dense, integral-skin plastic juxtaposed against said substantially flat surface, and a back cushion of plastic less dense and softer than said striking layer, the back cushion integrally contacting said striking layer such that the back cushion and striking layer together enclose substantially all of said stiff core member and said means.

Additionally, this invention provides a method of making a golf club, comprising the steps:

providing a substantially straight shaft having upper and lower ends, deforming a length of metallic tubing by flattening one end section and bending the end section so as to leave a first portion of the tubing which is straight and tubular, while defining a second portion which is substantially flattened and bent to define an obtuse angle with said first portion, securely affixing a flat metallic stiffener plate to one side of said second portion of the metallic tubing, inserting the lower end of said shaft snugly into said first portion of the metallic tubing, placing the lower end of the shaft, the tubing and the stiffener plate into a mold cavity into which plastic and a blowing agent can be injected, the mold cavity defining a striking surface, supporting the shaft, tubing and stiffener plate with respect to the mold cavity such that there is left a space of substantially uniform thickness between the stiffener plate and said striking surface of the mold cavity, closing the mold cavity, and admitting plastic and a blowing agent into the mold cavity and applying heat differentially to the mold so as to produce a substantially flat striking layer of dense, hard, integral-skin plastic in said space of substantially uniform thickness, said striking layer thus being juxtaposed against the stiffener plate remote from said second portion of the metallic tubing, and a back cushion of softer and less dense plastic integrally contacting said striking layer, such that the back cushion and the striking layer between them enclose said stiffener plate and all of said metallic tubing.

Finally, this invention provides a method of making a golf club, comprising the steps:

providing a substantially straight shaft having upper and lower ends, providing a stiff core member having a first portion adapted to be affixed to the lower end of said shaft, and a second portion which defines an obtuse angle with said first portion, with means on said second portion defining a substantially flat surface, affixing the lower end of said shaft to said first portion, placing the lower end of the shaft and said stiff core member into a mold cavity into which plastic and a blowing agent can be admitted, the mold cavity defining a striking surface, supporting the shaft and the stiff core member with respect to the mold cavity such that there is left a space of substantially uniform thickness between said flat surface and said striking surface of the mold cavity, closing the mold cavity, and injecting plastic and a blowing agent into the mold cavity and applying heat differentially to the mold so as to produce a substantially flat striking layer of dense, hard, integral-skin plastic in said space of substantially uniform thickness, said striking layer thus being juxtaposed against said flat surface, and a back cushion of softer and less dense plastic integrally contacting said striking layer, such that the back cushion and the striking layer between them enclose said stiff core member.

GENERAL DESCRIPTION OF THE DRAWINGS

Two embodiments of this invention are illustrated in the accompanying drawings, wherein like numerals denote like parts throughout the several views, and in which:

FIG. 1 is a schematic view, partly in section and partly in elevation, through the head and the lower shaft of a first embodiment of a golf club constructed in accordance with this invention;

FIG. 2 is a schematic view, similar to FIG. 1, of a second embodiment of a golf club constructed in accordance with this invention;

DETAILED DESCRIPTION OF THE DRAWINGS

Figure 3:
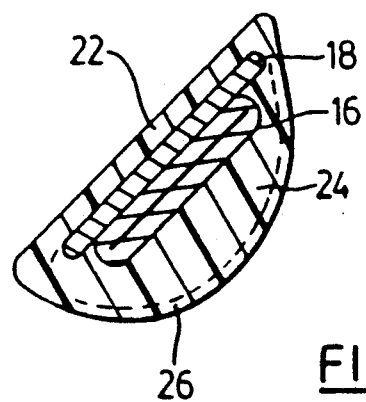
FIG. 3 is a sectional view taken at the line 3—3 in FIG. 1.

Attention is first directed to FIG. 1, which shows a club shaft 10, which is preferably made of ½ inch glass fibre composite tubing, with a wall thickness of 0.083 inches.

A second component of the club is a metallic member 12 which is made by deforming a length of metallic tubing at one end only, and bending the deformed end portion so as to leave the tubing at the other end straight and tubular. Looking at FIG. 1, the undeformed tubular portion of the metallic member 12 is shown at the numeral 14 whereas the flattened and bent portion is identified by the numeral 16. It will be noted that the shaft 10 is snugly received within the undeformed portion 14 of the metallic member 12. Also, the shaft 10 itself snugly receives a reinforcement member in the form of a stiff solid rod 17 of plastic which extends from a location within the undeformed tubular portion to a location about 1 ½ inches above the upper end of the first portion 14. The rod 17 has tapered ends, in order to minimize stresses. Further, the top end of the tubular portion 14 diverges smoothly upwardly as shown at the numeral 17a, again for the purpose of minimizing stress concentrations and reducing likelihood of breakage.

It will be noted that the portion 16 and the portion 14 of the metallic member define between them an obtuse angle.

Another component of this construction is a flat metallic stiffener plate 18, which may be stamped from a piece of 14 gauge steel plate. Other plate gauges may be used, depending upon the desired final weight of the golf club. In the embodiment shown, the stiffener plate 18 has marginal portions 20 which project beyond the flattened bent portion 16 of the metallic member 12, and have apertures 21. Other apertures 21a are provided within the marginal portion 20, and thus are closed by the presence of the flattened portion 16.

Referring now to FIG. 3, the head construction further includes a substantially flat striking layer 22 of dense, integral-skin plastic juxtaposed against the stiffener plate 18 on the side remote from the flattened bent portion 16.

Finally, the head construction includes a back cushion 24 of less dense and softer plastic which is integrally connected to the striking layer 22 both through the apertures 21 and in the region outside of the stiffener plate 18. Together, the back cushion 24 and the layer 22 surround the portion 16 and the stiffener plate 18.

The metallic member 12 may be cut from a piece of 14 gauge steel tubing.

Attention is now directed to FIG. 2, which shows an alternative embodiment of this invention. In FIG. 2, a shaft 10 is again provided. A stiff core member in the form of a solid metallic rod 30 is also provided. As can be seen in FIG. 2, the rod 30 is bent to define an obtuse angle, with a first end 32 being snugly received within the open centre of the shaft 10. A second end 34 supports a stiffener plate 36, and is secured thereto by welding. As with the plate 18, the plate 36 contains a plurality of apertures 38, and these allow the plastic on both sides of the stiffener plate 36 to interconnect. Depending on location, some of the apertures 38 may be closed by the presence of the second end 34 of the metallic rod 30.

Again with the embodiment of FIG. 2, the interaction of the various components with the plastic, and particularly the creation of the stiff striking layer (numeral 22 in FIG. 3), are as previously described.

Figure 4:
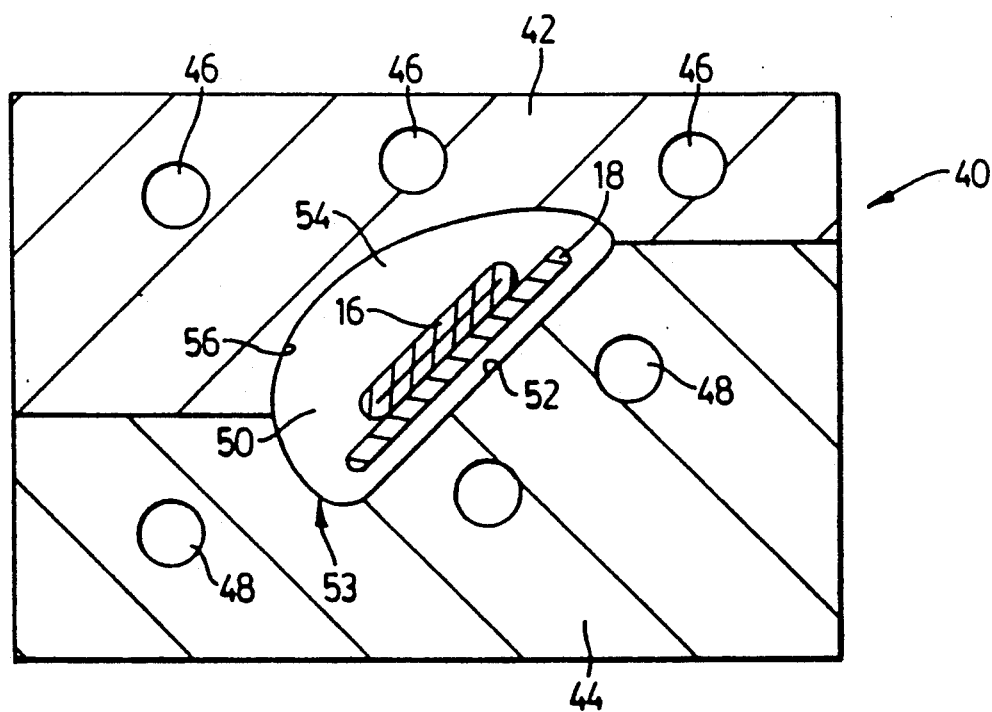
FIG. 4 is a sectional view of a mold suitable for molding the golf club of FIG. 1.

Attention is now directed to FIG. 4, which shows a mold 40 having an upper mold portion 42 and a lower mold portion 44. The numeral 46 identifies water passages in the upper mold portion 42, while the numeral 48 designates water passages in the lower mold portion 44. It has been found necessary to keep the upper mold portion 42 at a higher temperature than the lower mold portion in order to ensure that the plastic will set to a resilient, porous form above the components 16 and 18, but sets to a more solid and stiff form in the space below the component 18. Advantageously, the plastic is polyurethane and is mixed with a fluorocarbon blowing agent. Utilizing this mixture, the upper mold portion 42 is preferably maintained at a temperature between about 100° F. and 110° F., whereas the temperature of the lower mold portion 44 is maintained preferably between about 65° F. and about 75° F. The choice of polyurethane as the preferred material is discussed in greater detail below.

It is to be noted that the plastic and fluorocarbon combination is not injected into the cavity 50 at high pressure of the kind used in injection molding. Initially, the admitted mixture of plastic material and blowing agent is in a liquid state, and merely sits in the bottom half of the mold cavity 50. Then it begins to react and rise.

During the reaction, more fluorocarbon condensation will occur adjacent the colder half of the mold, i.e. the mold portion 44. This will produce a thick skin between the stiffener plate and a striking surface 52 of the cavity 50, and also in the region 53, where increased wear will occur. The plastic in this part of the cavity will be relatively stiff and hard, whereas the plastic developing in the upper portion 54 of the mold cavity 50 will be porous due to the higher temperature which inhibits fluorocarbon condensation. A thinner external skin is formed immediately adjacent the surface 56 of the mold cavity 50, but thickens in the region 53.

The method of manufacturing the golf club illustrated in FIG. 1 of the drawings includes several steps.

Firstly, a substantially straight shaft, preferably of reinforced fiberglass, is provided.

Next, a length of metallic tubing (the metallic member 12) is deformed by flattening one end and bending the flattened end so as to leave a first portion 14 of the tubing straight, tubular and undeformed, while defining a second portion which is substantially flattened and bent to define the already-mentioned obtuse angle with the first portion. The bell-shape seen at 17a is provided at the free end of the portion 14.

The flat, metallic stiffener plate 18, having apertures 21 and 21a, is then securely affixed, as by welding, to one side of the second portion 16 of the metallic tubular member 12. At this point, the rod 17 is inserted into the shaft 10, following which the lower end of the shaft 10 is inserted into the undeformed portion 14 of the metallic member 12, and secured in position. Securement is preferably by indenting the portion 14 as shown at 58 in FIG. 1. The indentation can be at any location around the periphery of the portion 14, and is created by a blow or sharp impact at the required site.

Then, the lower end of the shaft 10, the metallic member 12 and the stiffener plate 20 are inserted into a suitable mold, and blocked or clamped (by the mold parts) so as to ensure that the plate 18 is held in spaced relation adjacent the striker surface 52. A mixture of plastic and a blowing agent is then admitted into the mold. Heat is applied to or removed from the mold portions as described above so as to produce 1) a substantially flat striking layer of dense, integral-skin plastic (layer 22) juxtaposed against the stiffener plate 18 remote from the second portion 16 of the tubular metallic member 12, and 2) a softer, less dense back cushion 24 enclosing the stiffener plate 18 and all of the tubular metallic member 12. As already mentioned, the back cushion 24 is integrally connected to the striking layer 22 both through the apertures 21 and in the region beyond the edges of the stiffener plate 18. The striking layer 22 is stabilized by the presence of polyurethane in all of the apertures 21 and 21a.

The plastic is preferably polyurethane selected so as to form a hard, void-free skin 26 (see FIG. 3) surrounding the back cushion 24, as mentioned above. One suitable polyurethane system is that in which the resin component includes polyether polyols (both trifunctional and difunctional), amine catalyst, surfactant, difunctional chain extender and fluorocarbon blowing agent. The resin is reacted in the appropriate ratio with a hardener, and the resultant mixture is admitted into the mold cavity, as well as in the region 53. The urethane remains for a few seconds in a liquid state, sitting in the bottom half of the mold cavity, after which it begins to react and rise. During the polyurethane reaction, more fluorocarbon condensation will occur in the colder half of the mold (the lower half in FIG. 4). As mentioned above, this greater fluorocarbon condensation produces a thick skin in the space between the plate 18 and the surface 52 of the mold cavity, as well as in the region 53. The resultant urethane surface will thus be hard and long-wearing, in contrast to the other portion of the club head formed in the hotter top part of the mold cavity, which will have a much thinner skin and will feel much softer.

Those skilled in the art will appreciate that other plastic, hardener and blowing agent combination could be selected.

It is considered that the internal metal parts in the head of the golf club could be replaced by a molded insert made of stiff material such as certain plastics and defining the equivalent of the stiffener plate.

The method of manufacturing the golf club illustrated in FIG. 2 of the drawings includes the following steps.

Firstly, a substantially straight shaft, preferably of reinforced fiberglass, is provided.

Next, a solid metal rod (preferably soft steel) is provided, having a diameter which will fit snugly within the hollow shaft. The rod is bent to the shape shown in FIG. 2, following which the flat metal stiffener plate 36 is securely affixed, as by welding, to the bent end 34.

Then, the lower end of the shaft 10, the metallic rod 30 and the stiffener plate 36 are inserted into a suitable mold and blocked or clamped (by the mold parts) so as to ensure that the plate 36 is held in spaced relation adjacent the striker surface 52 (seen in FIG. 4). The polyurethane mixture is then admitted into the mold (assuming that polyurethane is being used). Heat is applied to or removed from the mold portions as described earlier, so as to produce (1) a substantially flat striking layer of dense, integral-skin plastic (analogous to the layer 22 in FIG. 3), and (2) a softer back cushion enclosing the stiffener plate 36 and the metallic rod portion 34 (corresponding to the back cushion 24 in FIG. 3).

Again, the back cushion will be of polyurethane which is less dense than the polyurethane of the striking layer, but is integrally connected to the striking layer both through the apertures 38 (FIG. 2) and in the region beyond the edges of the stiffener plate 36. Again as in the embodiment of FIG. 1, the striking layer is stabilized by the presence of polyurethane in the apertures 38.

While two embodiments of this invention have been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. A method of making a golf club, comprising the steps:

provided a substantially straight shaft having upper and lower ends, deforming a length of metallic tubing by flattening one end section and bending the end section so as to leave a first portion of the tubing which is straight and tubular, while defining a second portion which is substantially flattened and bent to define an obtuse angle with said first portion, securely affixing a flat metallic stiffener plate to one side of said second portion of the metallic tubing, inserting the lower end of said shaft snugly into said first portion of the metallic tubing, placing the lower end of the shaft, the tubing and the stiffener plate into a mold cavity into which plastic and a blowing agent can be injected, the mold cavity defining a striking surface, supporting the shaft, tubing and stiffener plate with respect to the mold cavity such that there is left a space of substantially uniform thickness between the stiffener plate and said striking surface of the mold cavity, closing the mold cavity and admitting plastic and a blowing agent into the mold cavity and applying heat differentially to the mold so as to produce a substantially flat striking layer of dense, hard, integral-skin plastic in said space of substantially uniform thickness, said striking layer thus being juxtaposed against the stiffener plate remote from said second portion of the metallic tubing, and a back cushion of softer and less dense plastic integrally contacting said striking layer, such that the back cushion and the striking layer between them enclose said stiffener plate and all of said metallic tubing.

2. The method claimed in claim 1, in which the stiffener plate is secured to one side of said flattened second portion by welding and has marginal portions projecting beyond said flattened second portion, said marginal portions having apertures, the step of admitting plastic including passing the plastic through said apertures, whereby the plastic of said striking layer extends to integrally contact the plastic of said back cushion.

3. The method claimed in claim 1, in which said plastic is polyurethane and said heat is applied such as to maintain substantially within the range from 100 degrees F. to 110 degrees F. the temperature of the part of the mold cavity which forms said back cushion, and such as to maintain substantially within the range from 65 degrees F. to 75 degrees F. the temperature of the striking surface of the mold cavity.

4. The method claimed in claim 1, in which the shaft is hollow, in which the end of said first portion which receives the shaft is smoothly divergent, and in which the insertion of the lower end of the shaft into said first portion is accompanied by inserting a stiffener rod snugly within the lower end of the shaft such that the stiffener rod extends from a location within said first portion to a location above the divergent end of said first portion, following which said first portion is mechanically and permanently distorted at a location which encloses part of the shaft and part of said stiffener rod.

5. A method of making a golf club, comprising the steps:

providing a substantially straight shaft having upper and lower ends, providing a stiff core member having a first portion adapted to be affixed to the lower end of said shaft, and a second portion which defines an obtuse angle with said first portion, with means on said second portion defining a substantially flat surface, affixing the lower end of said shaft to said first portion, placing the lower end of the shaft and said stiff core member into a mold cavity into which plastic and a blowing agent can be admitted, the mold cavity defining a striking surface, supporting the shaft and the stiff core member with respect to the mold cavity such that there is left a space of substantially uniform thickness between said flat surface and said striking surface of the mold cavity, closing the mold cavity, and injecting plastic and a blowing agent into the mold cavity and applying heat differentially to the mold so as to produce a substantially flat striking layer of dense, hard, integral-skin plastic in said space of substantially uniform thickness, said striking layer thus being juxtaposed against said flat surface, and a back cushion of softer and less dense plastic integrally contacting said striking layer, such that the back cushion and the striking layer between them enclose said stiff core member.

6. The method claimed in claim 5, in which said plastic is polyurethane, and said stiff core member comprises a tubular metallic member, said second portion being flattened with a stiffener plate secured to one side of said flattened second portion by welding, the stiffener plate having marginal portions projecting beyond said flattened second portion, said stiffener plate having apertures in said marginal portions and in the central region thereof, whereby some of the apertures are closed by said second portion, the step of injecting polyurethane including injecting polyurethane into the closed apertures, and passing polyurethane through the marginal apertures, whereby the polyurethane of said striking layer extends to integrally contact the polyurethane of said back cushion.

7. The method claimed in claim 5, in which said plastic is polyurethane, and said heat is applied such as to maintain substantially within the range from 100 degrees F. to 110 degrees F. the temperature of the part of the mold cavity which forms said back cushion, and such as to maintain substantially within the range from 65 degrees F. to 75 degrees F. the temperature of the striking surface of the mold cavity.

8. The method claimed in claim 5, in which the shaft is hollow, in which the stiff core member includes a tubular metallic member, the first portion thereof being adapted to snugly receive the lower end of the shaft, the end of said first portion which receives the shaft being smoothly divergent, and in which the insertion of the lower end of the shaft into said first portion is accompanied by inserting a stiffener rod snugly within the lower end of the shaft such that the stiffener rod extends from a location within said first portion to a location above the divergent end of said first portion, following which said first portion is mechanically and permanently distorted at a location which encloses part of the shaft and part of said stiffener rod.

* * * * *